United States Patent
Svensson

[15] 3,673,646
[45] July 4, 1972

[54] CHAIN HOOK
[72] Inventor: Stig Svensson, Ramnas, Sweden
[73] Assignee: Ramnas Bruks Aktiebolag, Ramnas, Sweden
[22] Filed: Dec. 9, 1970
[21] Appl. No.: 96,342

[52] U.S. Cl. .................................24/230.5 CR, 294/82 R
[51] Int. Cl. ..........................................A43c 11/08
[58] Field of Search ..............294/74, 82; 24/230.5 CR, 233, 24/236, 241 CH, 242; 59/93

[56] References Cited

UNITED STATES PATENTS 1,758,744  5/1930  Haubert .............................. 24/230.5
1,391,746  9/1921  McGuire ........................ 24/230.5 CR Primary Examiner—Evon C. Blunk
Assistant Examiner—Johnny D. Cherry
Attorney—Mason, Kolehmainen, Rathburn & Wyss

[57] ABSTRACT

A chain hook adapted to be detachably connected to an intermediate link in a chain between a pair of adjoining links connected thereto. The hook comprises a body having a lower bight and a pair of spaced-apart, upstanding legs defining a throat open at the upper end for receiving the intermediate link of the chain on a plane generally transverse of the body of the hook. The legs include spaced-apart stop surfaces on opposite sides which are engageable with said adjoining links for limiting transverse movement of the intermediate link once it is engaged in the throat, yet permitting free downward pivotal movement of one of said adjoining links toward the bight portion when pull is exerted on the chain. The body is provided with link support means extending transversely outwardly of said bight from at least one side thereof beyond said stop surfaces for supporting said intermediate link outwardly of said stop surfaces to reduce stress thereon.

5 Claims, 5 Drawing Figures

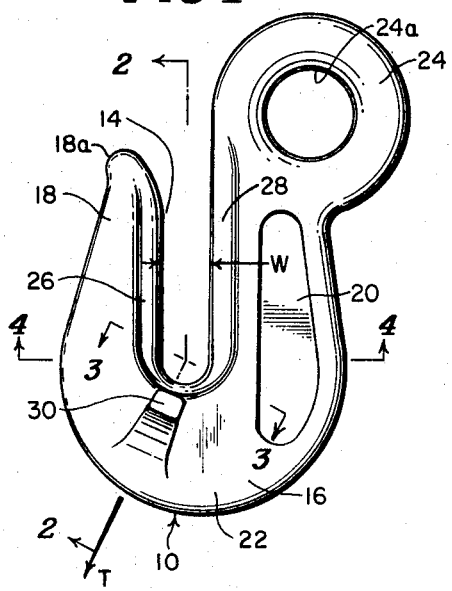
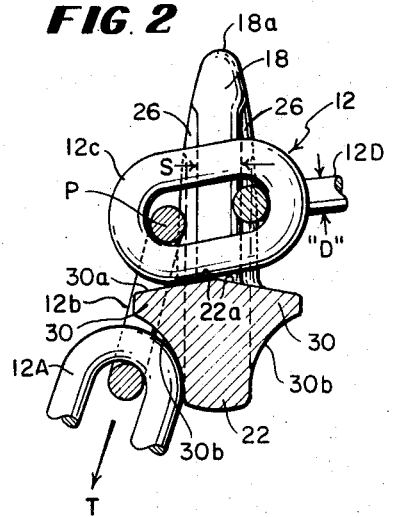
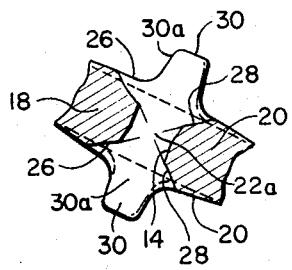
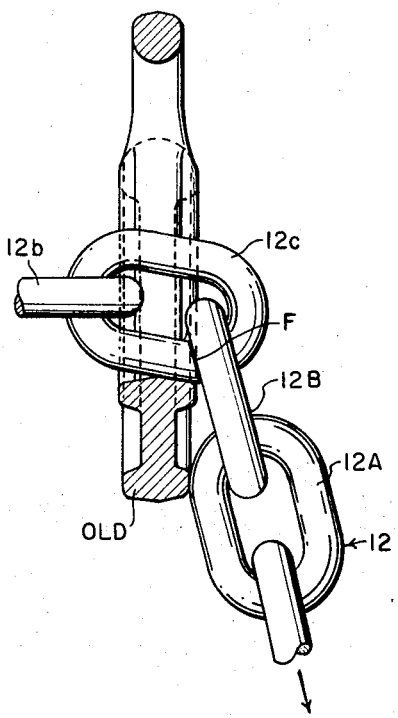
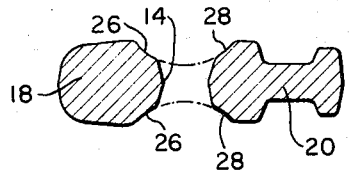
INVENTOR:
STIG SVENSSON;
BY: Mason, Kolehmainen, Rathburn & Wyss;
ATTORNEYS.

CHAIN HOOK

The present invention relates to a new and improved chain hook of the type used with lifting chains for adjusting the chain to desired lengths and/or forming a loop of chain of given length. In many prior art chain hooks of the type shown in FIG. 5 herein, the problem of excessive stress concentration in the particular chain link held in the throat of the hook often caused failure or breaking at stresses less than the rated strength of the chain.

It is therefore an object of the present invention to provide a new and improved chain hook of the character described which eliminates or greatly reduces stress concentration in the particular chain link held in the throat of the hook.

Another object of the present invention is to provide a new and improved chain hook of the character described which minimizes chances of rupturing or breaking a chain link because of excess bending stress.

Another object of the present invention is to provide a new and improved chain hook of the character described which is light in weight and easily manageable for rapid hitching to and unhitching from the chain.

In prior arrangements, many chain link ruptures are believed to be caused because the lower portion of the chain link held in the throat of the hook is subjected to a concentrated, high value, bending moment with resultant excessive shearing stresses developing across the link. One reason for the excessive stresses is believed to be that in prior art hooks (particularly of the type shown in FIG. 5) adequate support is not provided for the chain link which is held within the throat of the hook.

The chain hook of the present invention eliminates the foregoing disadvantages by properly supporting the chain link in the throat of the hook outwardly of the legs of the hook, thereby reducing stress concentrations and bending moment on the link.

In accordance with the present invention, the new and improved chain hook is provided with link supporting means extending transversely outwardly from at least one side of the hook body bight portion adjacent the bottom of the throat. The link support means provides a saddle for supporting the particular chain link in the throat of the hook outwardly of the body.

In the illustrated embodiment, the link support means takes the form of an integrally formed lug or finger which is positioned on the plane of pulling force which extends through the center of an eye forming means on one of the hook legs and the lower end of the throat defined between the legs of the hook. The adjoining links connected to opposite ends of the intermediate link held in the throat of the hook may be pivoted downwardly toward the bight and the link support projection then extends into the center of these adjoining links to help in alignment of the links. The intermediate link held in the throat of the hook is supported transversely outward of the sides of the hook body, and it is believed in theory that this additional support reduces the bending moment and resultant shear stress on the link. Preferably, link support projections are provided on both sides of the hook body so that pull on the chain may be exerted from either end and adequate support will still be provided.

For a better understanding of the present invention, reference should be had to the following detailed description taken in conjunction with the drawings, in which:

FIG. 1 is a side elevational view of a new and improved chain hook constructed in accordance with the features of the present invention;

FIG. 2 is a sectional view through the hook taken substantially along line 2—2 of FIG. 1 and illustrating a chain held by the hook;

FIG. 3 is a fragmentary sectional view taken substantially along line 3—3 of FIG. 1;

FIG. 4 is a cross-sectional view taken substantially along line 4—4 of FIG. 1; and FIG. 5 is a longitudinal, transverse, sectional view taken through a typical prior art hook with a chain attached thereto showing how excessive stress concentrations are developed, causing chain link failures.

Referring now, more particularly, to the drawings, therein is illustrated a new and improved chain hook constructed in accordance with the features of the present invention and referred to by the reference numeral 10. The chain hook 10 is adapted to be used with a chain 12 having a plurality of interconnected links 12A, 12B, 12C, 12D, etc., comprising oblong loops, as illustrated in FIG. 2. The chain 12 is preferably formed of metal or steel wire having a nominal diameter "D" and formed into welded loops as shown. Welded chains of this type are commonly used for lifting heavy loads and have relatively high strength in comparison with the size and weight of the chain.

In accordance with the present invention, the hook 10 is especially adapted for eliminating or greatly reducing failures or ruptures of the intermediate chain link 12C which is securely held in the open-ended throat 14 of the hook. The throat 14 is designed with a width "W" which is slightly larger than the diameter "D" of the chain links with which the hook is to be used in order to permit the chain links to be easily slipped into and out of the throat. The hook 10 includes a body 16 formed of high strength metal, such as forged steel, and the like, comprising a pair of upstanding legs 18 and 20 integrally joined at the lower end by a bight portion 22. The inside surfaces of the legs 18, 20 and bight 22 form a U-shaped throat configuration (best shown in FIG. 1), and at the lower end of the throat the bight provides a saddle for support of the intermediate link 12C of the chain. The upper end portion of the left-hand leg 18 is pointed and rounded, as at 18a, to more easily guide the chain links into the upper end of the throat 14. The upper end of the leg 20 is formed with an integral eyelet 24 adapted for connection with a cable clamp or pin in conventional fashion. The eyelet 24 includes a transverse bore 24a for receiving a pin or cable, and the axis of the bore 24a is generally perpendicular to the plane of the hook body 16.

In accordance with the present invention, each of the hook legs 18 and 20 is formed with a pair of upstanding, oppositely facing, concave, stop surfaces 26 and 28, respectively. The radius of curvature of the stop surfaces 26, 28 is substantially equal to the outside radius of curvature of the end portions of the chain links. In order to lock the intermediate link 12C in the throat 14, end portions of the adjoining chain links 12B and 12D are drawn into contact against the stop surfaces when pull is exerted on the chain. The pairs of stop surfaces 26 and 28 are spaced apart by a distance "S" (FIG. 2), which permits free downward movement of the link 12C into the throat and permits free pivotal movement of one of the adjoining chain links, such as the link 12B when the other adjoining link 12D is against and bearing on the adjacent stop surfaces 26 or 28. Pivotal movement downwardly toward the bight 22 by the adjoining chain link 12B is about a pivot axis labeled "P" (FIG. 2), which axis is generally perpendicular to the transverse plane of the intermediate link 12C held in the throat 14. The axis "P" is spaced outwardly from the adjacent pair of stop surfaces 26, 28 and, as shown, free pivotal movement of the link 12B is permitted while restraint against longitudinal shifting of the intermediate link 12C on the transverse plane is prevented by engagement of the end of the adjoining link 12D against the opposite stop surfaces 26 and 28.

In FIG. 2, the hook 10 and chain 12 are shown as they appear when a tension force "T" is exerted downwardly on the chain (indicated by the arrow) by pull on the connecting link 12A. In this position, the chain 12 is prevented from slipping out of the throat 14 of the hook by engagement between the end loop of the link 12D and the right-hand stop surfaces 26 and 28.

In accordance with the invention, the lower end of the throat 14 provides a supporting saddle for the intermediate link 12C of the chain 12 in a manner which greatly reduces of eliminates excessive bending stress concentration, which stresses commonly cause chain link failures or ruptures in prior art chain hooks of the type illustrated in FIG. 5.

In order to reduce the bending stress on the intermediate link 12C in the throat 14 of the hook, the body is formed with a pair of transversely outwardly extending link support projections 30 which are integrally formed on the bight 22. It is to be understood that only a single link support projection 30 need be provided if chain pull is exerted only in one direction; however, to provide increased versatility, it is desirable to provide link support projections 30 on both sides of the hook. The lugs or projections 30 extend transversely outwardly of opposite sides of the hook body in a direction generally parallel to the intermediate link 12C. Outer end portions of the projections 30 are spaced outwardly of the adjacent stop surfaces 26 and 28 on the legs as well as the pivot axis of the adjoining links 12B and 12D as represented by the letter "P". The link support projections 30 have sloping upper saddle surfaces 30a which provide support for the chain link 12C (best shown in FIG. 2) outwardly of the stop surfaces 26 and 28 and below the axis "P". The surfaces 30a are contiguous to and form extensions of a saddle or link supporting surface 22a in the throat 14 on the bight portion 22.

As best shown in FIG. 2, the surfaces 22a and 30a on opposite sides of the longitudinal center plane of the hook body slope downwardly and outwardly to better support the intermediate link 12C in a locked position, which is tilted from the horizontal position because of the tension exerted on the chain in the direction of the arrow "T". The link 12C is supported beneath the pivot axis "P" at a position outwardly of or closely adjacent to the outer surface of the adjacent stop surfaces 26 and 28 and thereby the bending moment on the intermediate link 12C is greatly reduced below that of a conventional hook, as illustrated in FIG. 5.

Referring to FIG. 1, the link support lugs 30 are bisected by a pulling force plane which is coextensive with the arrow "T" and which extends through the center of the eyelet bore 24a and the center axis of the lower end of the throat 14. It is along this plane that pulling force is exerted on the hook 10 when pull is exerted on the chain link 12A. The plane of pulling force angularly intersects a vertical center plane which bisects the throat 14 of the hook.

As best shown in FIG. 3, the outer ends of the link support projections 30 are rounded somewhat to facilitate guidance and penetration into the center of intermediate links 12B and 12D when these links are pivoted downwardly towards the bight 22 of the hook body. The lugs or projections 30 help to center and align the adjoining links 12B and 12D, and the opposite side surfaces are tapered towards one another, as best shown in FIG. 3, to facilitate centering the links and alignment thereof.

In accordance with the present invention, the undersides of the link support projections 230 are formed with concave, gusset-type recesses 30b having radii substantially the same as those of the end radii of the links of the chain. Because of this, the link 12A and any additional links which may be connected with the link 12D are free to pivot toward the bight 22 of the hook to a reduced angle. This reduced angle between the pulling force "T" exerted in the direction of the arrow "T" and a vertical plane along the center of the hook body (as shown in FIG. 2) provides for better support of the intermediate link 12C at a point outwardly closer to the plane of the pulling force and thus reduces the bending moment and stress on the intermediate link 12C. The hook 10, constructed in accordance with the present invention, is thus extremely easy to hitch to and unhitch from a chain 12 and the stress on the intermediate link 12C held in the throat 14 of the hook is greatly reduced over that in prior art hooks.

FIG. 5 represents a typical prior art arrangement wherein the chain link 12C is not provided adequate support outwardly toward the plane of the pulling force exerted on the chain. The area "F" represents a region of excessive stress and a region wherein failure of the links oftentimes occurs even when the pull on the chain is less than the rated strength of the chain. Failure of the chain links is believed to be due to excessive bending stress concentration because of inadequate link support in prior art hooks of the type shown in FIG. 5.

The hook 10 of the present invention, however, greatly reduces or eliminates this type of chain link failure, and is extremely well suited for handling rated and even excessive loads with ease.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. In combination with a chain, a chain hook adapted to be detachably connected therewith, said chain including links having rounded opposite ends and at least an intermediate link and a pair of adjoining links connected thereto, said hook comprising a body having a lower bight and a pair of spaced-apart, upstanding legs defining a throat open at the upper end for receiving said intermediate link on a plane transverse of said body and bisecting said throat, said legs each including a pair of concave spaced-apart stop surfaces on opposite sides engageable with a rounded end of said adjoining links for limiting movement of said intermediate link along said plane while engaged in said throat, said legs dimensioned for permitting downward pivotal movement of at least one of said adjoining links toward said bight about a pivot axis normal to said plane when the other adjoining link is engaged against an adjacent stop surface, and link support means including a pair of lateral projections extending from said bight transversely outwardly of both pairs of said stop surfaces in opposite directions forming a pair of saddle surfaces for supporting said intermediate link below said pivot axis, said saddle surfaces sloping downwardly and outwardly from an intersection thereof intermediate said opposite stop surfaces of each leg in said throat, each projection including a concavely curved underside sloping upwardly and outwardly from a lower edge of said bight, said concavely curved surfaces adapted to receive a curved end portion of an outer chain link connected to said adjoining link and forming bearing surfaces supporting said outer chain link for pivotal movement downward toward said bight.

2. The hook of claim 1 including eye forming means adjacent the upper end of one of said legs, said link support means bisected by a plane of pulling force on said hook extending through the center of said eye forming means and angularly intersecting said transverse plane adjacent the bottom of said throat.

3. The hook of claim 2 wherein said link support means includes opposite side faces tapering outwardly and convergent toward said plane of pulling force for guiding the center of said one adjoining link into said downwardly pivoted position toward said bight.

4. The hook of claim 1 wherein said projections of said link support means are tapered to a reduced width at their outer ends to extend into and center said one adjoining link adjacent the center thereof between opposite curved end portions of said intermediate link and said outer chain link.

5. The hook of claim 1 wherein said stop surfaces comprise pairs of oppositely facing, spaced-apart, upstanding, concave surfaces substantially conforming to the curvature of an end portion of a link of said chain, said stop surfaces extending upwardly of said bight.

* * * * *